(12) United States Patent
Dwivedi

(10) Patent No.: US 10,636,044 B2
(45) Date of Patent: Apr. 28, 2020

(54) PROJECTING RESOURCE DEMAND USING A COMPUTING DEVICE

(71) Applicant: Accenture Global Solutions Limited, Dublin (IE)

(72) Inventor: Mohitash Dwivedi, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 379 days.

(21) Appl. No.: 15/070,086

(22) Filed: Mar. 15, 2016

(65) Prior Publication Data

US 2017/0270543 A1 Sep. 21, 2017

(51) Int. Cl.
*G06Q 10/06* (2012.01)
*G06Q 10/10* (2012.01)
*G06Q 30/02* (2012.01)

(52) U.S. Cl.
CPC ....... *G06Q 30/0202* (2013.01); *G06Q 10/067* (2013.01)

(58) Field of Classification Search
CPC ........ G06Q 10/06; G06Q 10/10; G06Q 30/02; G06Q 10/02; G06Q 40/06
USPC ....................................................... 705/7.31
See application file for complete search history.

(56) References Cited

U.S. PATENT DOCUMENTS

| | | | | |
|---|---|---|---|---|
| 2005/0096963 A1* | 5/2005 | Myr | ................ | G06Q 10/06375 705/7.35 |
| 2008/0273591 A1* | 11/2008 | Brooks | ................ | H04N 7/1675 375/240.01 |
| 2011/0010226 A1* | 1/2011 | Guild | .................... | G06Q 30/02 705/7.31 |
| 2011/0054860 A1* | 3/2011 | Guild | ................... | G06Q 10/04 703/2 |
| 2011/0061015 A1* | 3/2011 | Drees | .................... | G05B 15/02 715/771 |
| 2011/0066449 A1* | 3/2011 | Backhaus | ............ | G06F 19/327 705/2 |
| 2011/0295575 A1* | 12/2011 | Levine | .................. | G06Q 30/02 703/2 |
| 2012/0079497 A1* | 3/2012 | Gangemi | ............. | G06F 9/5011 718/104 |
| 2012/0084063 A1* | 4/2012 | Drees | .................... | G06Q 10/06 703/6 |
| 2014/0108094 A1* | 4/2014 | Beddo | ................. | G06Q 10/067 705/7.31 |

(Continued)

*Primary Examiner* — Nga B Nguyen
(74) *Attorney, Agent, or Firm* — Mannava & Kang, P.C.

(57) ABSTRACT

Examples of the disclosure project resource demand. In some examples, a first factor that corresponds to a task and/or a resource is identified. The first factor is associated with one or more scenarios. A model associated with the scenarios is generated. The model includes the first factor. The model is used to generate a projection associated with an expected resource demand for a first scenario. The projection is compared with historical data associated with an actual resource demand for the first scenario to determine a variance between the projection and the historical data. Based on the variance, a second factor that does not directly correspond to the task and/or the resource is generated. The second factor is configured to increase an accuracy of the model. Aspects of the disclosure enable the model to be generated, maintained, and/or updated in a calculated and systematic manner for increased performance.

14 Claims, 9 Drawing Sheets

(56) References Cited

U.S. PATENT DOCUMENTS

| | | | |
|---|---|---|---|
| 2015/0287057 A1* | 10/2015 | Baughman | G06Q 30/0202 |
| | | | 705/7.31 |
| 2016/0196587 A1* | 7/2016 | Eder | G06Q 30/00 |
| | | | 705/14.49 |
| 2016/0307272 A1* | 10/2016 | Thalken | G06Q 40/06 |
| 2017/0140007 A1* | 5/2017 | Agarwal | G06Q 10/0637 |

* cited by examiner

| | Pseudo Relation (equation constant - weights derived) | BLACK BOX | | Assumptions | Scenario unique/ redundant/ outlier? | Scenario Analysis based on Input Factors (to be used for future predictions) | Forecasted Effort | Actual Effort | Variance % | Variance > +/-1% |
| | | Pseudo Multiplier (calculated) | Pseudo Constant (calculated) | | | | | | | |
|---|---|---|---|---|---|---|---|---|---|---|
| 1 | | 1 | 100 | Driver X is useless. Other drivers have direct proportionality | Unique | NA | 533.3 | 600 | 0.02% | No |
| 2 | | 1 | 100 | Driver X is useless. Other drivers have direct proportionality | Unique | NA | 810.5 | 810 | 0.06% | No |
| 3 | | 1 | 100 | Driver X is useless. Other drivers have direct proportionality | Unique | NA | 788 | 790 | 0.25% | No |
| 4 | | 1 | 100 | Driver X is useless. Other drivers have direct proportionality | by Metadata Tr... | NA | 619.9 | 620 | 0.02% | No |
| 5 | summation of (activity driver weight*activity driver or metadata value*activity duration*activity driver multiplier) & (resource metadata*weight *resource metadata multiplier) | 1 | 100 | Driver X is useless. Other drivers have direct proportionality | Unique | NA | 658.5 | 660 | 0.23% | No |
| 6 | | 1 | 100 | Driver X is useless. Other drivers have direct proportionality | Outlier | Cannot predict based on known factors - some driver is | 674.5 | 450 | 49.89% | Yes |
| 7 | | 1 | 100 | Driver X is useless. Other drivers have direct proportionality | Unique | NA | 505.5 | 510 | 0.88% | No |
| 8 | | 1 | 100 | Driver X is useless. Other drivers have direct proportionality | Unique | NA | 566.5 | 565 | 0.27% | No |
| 9 | | 1 | 100 | Driver X is useless. Other drivers have direct proportionality | Unique | NA | 533.9 | 600 | 0.02% | No |
| 10 | | 1 | 100 | Driver X is useless. Other drivers have direct proportionality | Unique | NA | 506.5 | 505 | 0.30% | No |
| 11 | | 1 | 100 | Driver X is useless. Other drivers have direct proportionality | Outlier | Resource Metadata3 increased by 100%; Activity Duration reduced by 100%; Demand increased by 84% | 618.5 | 1000 | 38.35% | Yes |

PROJECTING RESOURCE DEMAND USING A COMPUTING DEVICE

BACKGROUND

Resource management involves the development and implementation of an organization's resources to effectively and efficiently execute desired tasks using several elements. One discipline of resource management includes resource forecasting, which generally involves predicting or projecting resource demand for particular tasks. Over time, techniques have been developed and implemented to aid in resource forecasting. For example, at least some known techniques project resource demand and/or allocate resources in accordance with the projected resource demand by gathering data from various sources. To efficiently project resource demand, however, at least some known techniques focus on conforming data, discarding nonconforming or outlier data, and, thus, are not configured to adapt to changing circumstances, which are often associated with outlier data, until the changing circumstances become the norm, if ever. Known techniques may be unable to manage data, including outlier data, from a plurality of sources to adapt to changing circumstances. As a result, certain resource allocation problems may be difficult or impossible to solve using known techniques.

SUMMARY

Examples of the disclosure enable predicting resource demand for one or more scenarios in an efficient and effective manner. In some examples, one or more first factors that correspond to a task and/or a resource are identified. The first factors are associated with one or more scenarios. A model associated with the scenarios is generated. The model includes the identified first factors. The generated model is used to generate a first projection for a first scenario. The first projection is associated with an expected resource demand for the first scenario. The generated first projection is compared with first historical data to determine a first variance between the generated first projection and the first historical data. The first historical data is associated with an actual resource demand for the first scenario. Based on the determined first variance, a second factor that does not directly correspond to the task and/or the resource is generated. The second factor is configured to increase an accuracy of the model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6 and 7 are screenshots of an example resource demand projection.

FIG. 8 is a screenshot of a plurality of iterations of an example resource demand projection.

Corresponding reference characters indicate corresponding parts throughout the drawings.

DETAILED DESCRIPTION

Figure 1:
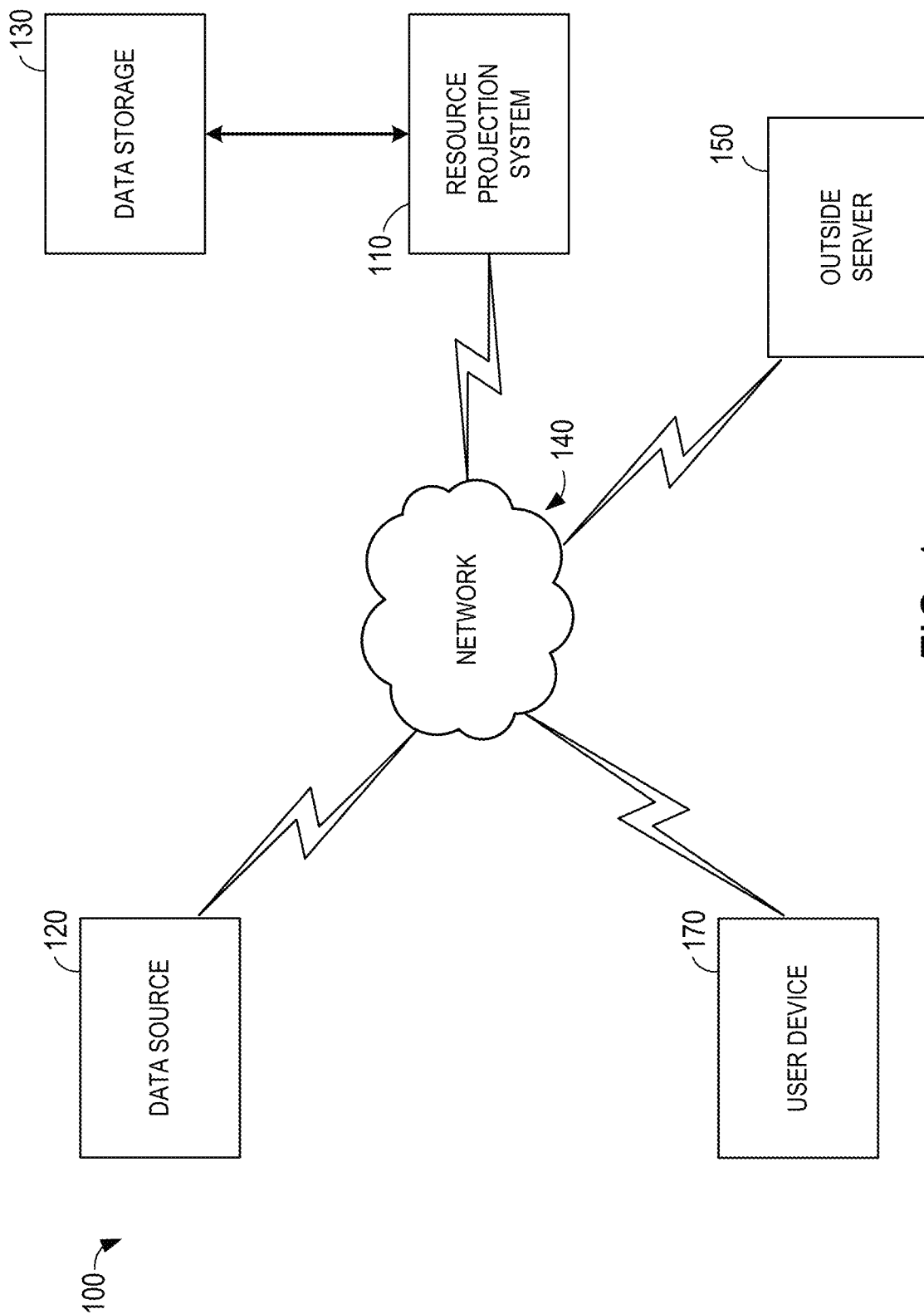
FIG. 1 is a block diagram illustrating an example environment for projecting resource demand.

The subject matter described herein relates generally to information processing and, more specifically, to predicting or projecting resource demand. Examples of the disclosure enable resource demand to be projected for one or more scenarios using computer-implemented resource projection techniques. In some examples, one or more factors associated with a task (e.g., activity) and/or one or more resources are identified to generate a computer-implemented model. Generally, a factor is indicative of a trait, characteristic, or attribute of a task or resource that is configured to impact or influence an outcome or result (e.g., a resource demand). For example, in a clinical trial scenario, activity-related factors may include a duration of time for administering a drug, a duration of time for checking vital signs, and a duration of time for conducting surveys; and resource-related factors may include a quantity of available drugs, a quantity of available medical equipment, a quantity of medical personnel.

The model may be used to generate, based on the identified factors, one or more projections of a demand on the resources for one or more scenarios. A projection may include an estimate or forecast of a result (e.g., an expected demand) for a scenario based on historical data. The projection may be compared with a historical (e.g., actual or real-world) occurrence of the scenario. If a variance between the projection data and the historical data exceeds a predetermined threshold (e.g., if the model did not accurately predict the resource demand), the model may be tuned, modified, or adapted so that the variance satisfies the predetermined threshold. In this manner, examples of the disclosure are sensitive to outlier scenarios in that an outlier scenario may be used to tune, modify, or adapt a model, where in conventional models they have would been discounted or ignored. Actions that may be taken to amend the model include, for example, selecting a factor, unselecting a factor, identifying a new factor, amending a weight attributed to a factor, amending a multiplier attributed to a factor, and/or amending a multiplier associated with the model.

In some examples, the variance between the projection data and the historical data may not be directly attributable to an activity-related factor and/or a resource-related factor. For example, another type of factor that does not directly correspond to a trait, characteristic, or attribute of a task or resource (e.g., a pseudofactor) may have an affect or impact on the outcome or result. Accordingly, in some examples, a psuedofactor may be determined and/or identified to tune, modify, or adapt the model so that the variance satisfies the predetermined threshold.

Examples of the disclosure enable resource demand to be projected in an efficient and effective manner. For example, the examples described herein utilize nonconforming or outlier data to amend a model, thereby enabling the model to project resource demand for a range of scenarios and/or adapt to changing circumstances. The examples described herein may be implemented using computer programming or engineering techniques including computing software, firmware, hardware, or a combination or subset thereof. Aspects of the disclosure enable a predictive model to be generated, maintained, and/or updated in a calculated and systematic manner for increased performance.

The examples described herein implement one or more operations or computations associated with managing resources. By managing resources in the manner described in this disclosure, some examples reduce processing load, conserve memory, and/or reduce network bandwidth usage by systematically generating, maintaining, and/or updating relevant models so that a new model is not generated with each changing circumstance. Moreover, some examples further reduce processing load, conserve memory, and/or reduce network bandwidth usage by giving less credence, or weight, to data associated with redundant scenarios in iterative calculations and, in some examples, ignoring the data altogether. For example, a model may be amended based on nonconforming or outlier data, allowing at least some system resources (e.g., processor, memory, network bandwidth) to be allocated to the processing, storing, and/or transmitting of the outlier data and, in some instances, preserved. Additionally, some examples may improve operating system resource allocation and/or improve communication between computing devices by streamlining at least some operations, improve user efficiency and/or user interaction via user interfaces or other input/output mechanisms, and/or reduce error rate by automating at least some operations associated with managing resources.

Examples of the disclosure approach resource demand projections from a technical aspect currently unused and unanticipated in the field and beyond the scope that mere human calculation could accomplish. Historically, resource demand predications were performed manually, including manually adjusting an algorithm used to predict the resource demand. However, manually adjusting an algorithm is a tedious, time-consuming, error prone, imperfect process that has several drawbacks, including human-introduced error, less accurate calculations due to analysis based on only directly-recognizable or apparent factors, short-sighted analysis based on using data from an undersized time frame, and subjectively accounting for inconsistent projections generated by the algorithm.

The examples described in this disclosure include a computer-based system that consistently generates projections with an accuracy that is unattainable by a human-monitored resource demand projection system. For example, data from a plurality of data sources may be assessed to determine one or more factors and, in some examples, one or more pseudofactors that impact a resource demand projection. For example, a pseudofactor may enhance or modify a model to account for a variance between a historical resource demand for one or more scenarios and a first portion of a projected resource demand generated for the one or more scenarios based solely on activity-related factors and resource-related factors. The pseudofactor may be black box that generates a second portion of the projected resource demand such that a variance between the historical resource demand and the projected resource demand (e.g., the first portion and the second portion) satisfies a predetermined threshold (e.g., the model accurately predicts the resource demand for the one or more scenarios). Moreover, the examples described herein may amend a model based on one or more relationships between factors, timing aspects, and/or other considerations that impact resourcing. For example, one or more relationship between factors having short-term impact and/or long-term impact may be identified. The examples described herein provide for self-calibrating algorithms that may achieve a target of less than 1% variance between projected resource demand and actual resource demand through smart code that automatically adapts to generate appropriate computation logic.

FIG. 1 is a block diagram illustrating an example system or environment 100 for predicting resource demand in a network of computing devices. The environment 100 includes a resource projection system 110 configured to generate one or more predictions or projections for one or more scenarios. The resource projection system 110 may communicate with one or more data sources 120 to access historical data that may impact, directly or indirectly, one or more projections generated by the resource projection system 110. Historical data may include, for example, start dates, end dates, durations (e.g., a time period between a start date and an end date), values associated with metadata, and/or values associated with drivers. Metadata may include a factor that associates a resource with an activity and/or provides information about other data used in the resource projection system 110 (e.g., a status of a server storing historical data, etc.). A driver may include a factor that is associated with an activity and/or a resource. The metadata and/or drivers may be selected from one or more data sources 120 as having the potential to impact a projection. In one example, one or more data sources 120 may store historical data associated with a task or activity (e.g., start dates, end dates, relationships with other tasks, drivers impacting variations in timelines, etc.), historical data associated with a resource (e.g., start dates, end dates, working hours, drivers impacting work, etc.), historical data associated with a resource and a task (e.g., metadata associating the resource with the task), historical data associated with resource demand, and/or historical data associated with deviations that may be attributed to a particular scenario.

In some examples, the data sources 120 are configured to store the historical data, and the resource projection system 110 is configured to receive and/or retrieve the historical data from the data source 120. One or more data sources 120 may be local to the resource projection system 110. For example, at least one data source 120 may include a data storage 130 that is coupled directly to the data storage 130. Additionally or alternatively, one or more data sources 120 may be remote from the resource projection system 110. For example, one or more networks 140 may be used to couple an outside server 150 to the resource projection system 110. Example networks 140 include a personal area network (PAN), a local area network (LAN), a wide area network (WAN), a cellular or mobile network, and the Internet. Alternatively, the network 140 may be any communication medium that enables a plurality of computing devices to communicate with each other.

The outside server 150 may be associated with a supplier entity, an affiliate entity, an associate entity, a subsidiary entity, and/or a third party entity. In some examples, the resource projection system 110 is associated with one or more levels of authorization that enables the resource projection system 110 to receive and/or retrieve historical data from one or more outside servers 150. For example, the resource projection system 110 may be associated with a first level of authorization that enables the resource projection system 110 to access historical data at a first outside server 150 associated with a third party supplier entity, and a second level of authorization that enables the resource projection system 110 to access historical data at a second outside server 150 associated with a subsidiary entity.

A user device 170 may access the resource projection system 110 to generate one or more projections. Example user devices 170 may include, for example, a personal computer, a laptop computer, a desktop computer, a server computer, a mobile device, a mobile telephone, a phablet, a tablet, a portable media player, a netbook, a computing pad, a handheld device, a kiosk, a tabletop device, an industrial control device, a multiprocessor system, a microprocessor-based system, a set top box, a programmable consumer electronic, a network computer, a minicomputer, a mainframe computer, distributed computing environments that include any of the above systems or devices, and the like.

Figure 2:
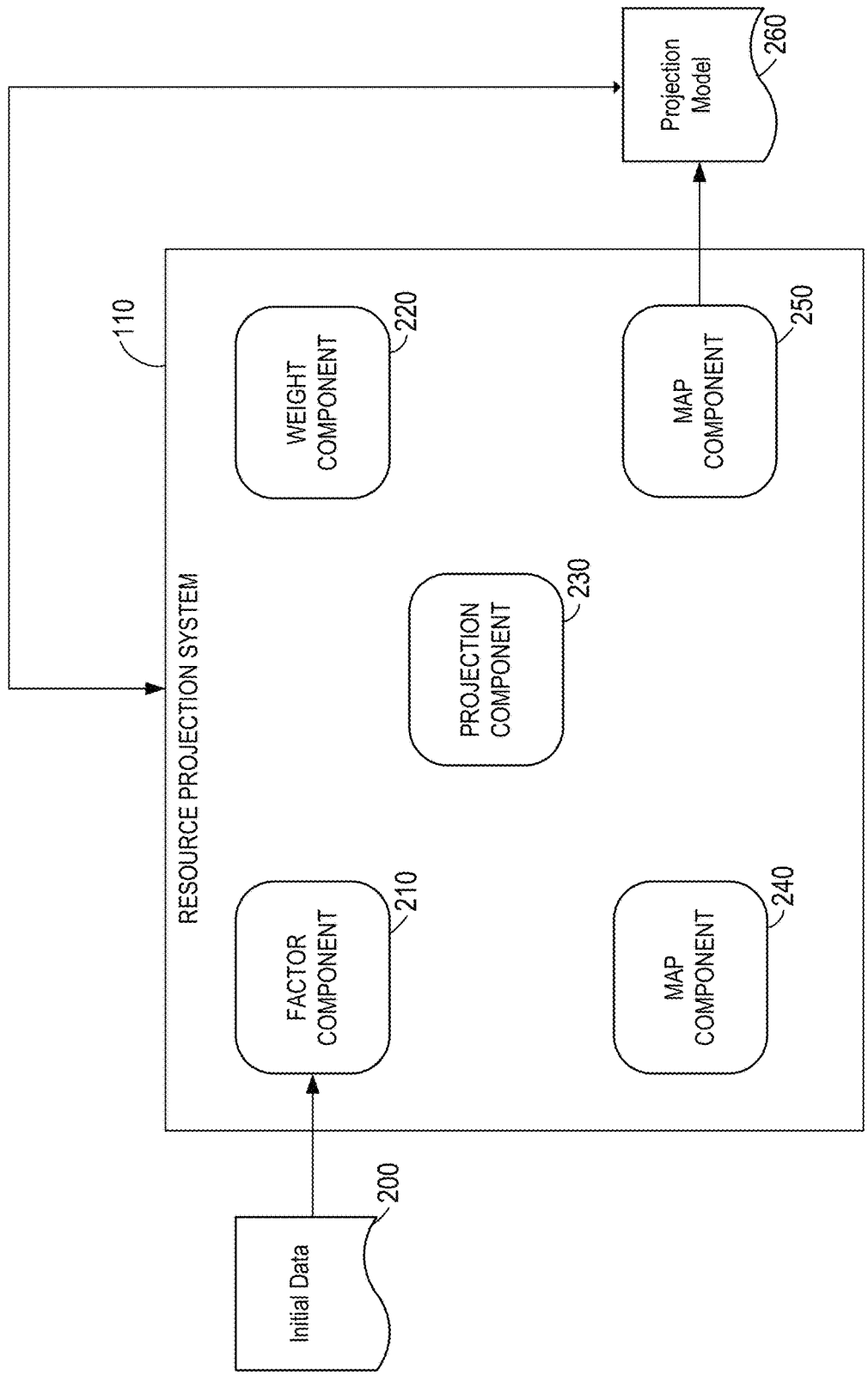
FIG. 2 is a block diagram illustrating example components that may be used to project resource demand.

FIG. 2 is a block diagram illustrating example components of the resource projection system 110. In some examples, the resource projection system 110 includes a factor component 210 that may receive data and identify factors that may impact a resource demand projection, a weight component 220 that may assign weights to factors, a projection component 230 that may generate projections for one or more scenarios, a comparison component 240 that may assess an accuracy of a model, and/or a map component 250 that may classify factors into categories. One component of FIG. 2, as well as other figures, may communicate with another component to implement the operations described in this disclosure. In some examples, one or more components are configured to communicate with other computing systems and/or devices, such as the data source 120 and/or user device 170.

The factor component 210 is configured to receive and/or retrieve initial data 200 for generating one or more projection models 260. In some examples, the initial data 200 includes data associated with one or more scenarios for which one or more projections are generated. Initial data 200 may include, for example, an identifier of one or more tasks or activities, an identifier of one or more resources, an identifier of one or more factors (e.g., metadata, drivers, etc.) associated with activities or resources, one or more parameters (e.g., constants, variables, thresholds, etc.) associated with the factors, etc. Additionally or alternatively, the initial data 200 may include historical data received and/or retrieved from one or more data sources 120 (e.g., data storage 130, outside server 150).

Based on the initial data 200, the factor component 210 is configured to identify one or more factors (e.g., metadata, drivers, etc.) that may impact a resource demand projection. A first factor, for example, may correspond to an activity and/or a resource. For example, the factor component 210 may identify one or more metadata associated with an activity, one or more drivers associated with an activity, one or more metadata associated with a resource, and/or one or more drivers associated with a resource. Additionally or alternatively, the factor component 210 may identify and/or generate a second factor (e.g., a pseudofactor) that may impact a resource demand projection. The second factor may be a black box that does not directly correspond to an activity and/or a resource itself. For example, the second factor may correspond to a portion of the resource demand projection that is not directly attributable to any of the first factors.

The weight component 220 is configured to determine one or more weights associated with the one or more first factors and/or the second factor. A weight is a value that indicates a relative importance of a factor corresponding to the weight. That is, a factor may be emphasized by increasing a weight associated with the factor, or deemphasized by decreasing the weight associated with the factor. For example, a factor may be added or selected by increasing a weight of the factor from 0.0 to a value greater than 0.0. Conversely, a factor may be removed or unselected by decreasing a weight of the factor from a value greater than 0.0 to 0.0.

In some examples, a set of weights may be assigned to a class (e.g., collection, group, set, etc.) of factors independent of the other classes of factors so that each class of factors is associated with a set of weights that have a sum of 1.0 or 100%. For example, a first set of weights may be assigned to a first class of first factors (e.g., metadata and drivers associated with an activity), and a second set of weights may be assigned to a second class of first factors (e.g., metadata and drivers associated with a resource). Accordingly, where a class of factors includes a single factor (e.g., a pseudo-factor), the single factor may be assigned a weight of 1.0 or 100%.

In some examples, the weights are determined based upon an impact of the factors on a variance between a projected resource demand and an historical (e.g., actual or real-world) resource demand. Factors associated with increasing an accuracy of the projected resource demand (e.g., reducing the variance) may be associated with a greater weight. On the other hand, factors associated with not increasing the accuracy of the projected demand may be associated with a lower weight. In some examples, the weight component 220 may ignore one or more factors associated with weights that are less than a predetermined threshold (e.g., 5%).

To indicate an importance of a class of factors relative to another class of factors, the weight component 220 may determine one or more multipliers associated with the classes of factors. Accordingly, a class of factors may be emphasized by increasing a multiplier associated with the class of factors, or deemphasized by decreasing the multiplier associated with the class of factors. For example, a first multiplier may be assigned to a first class of first factors (e.g., metadata and drivers associated with an activity), and a second multiplier may be assigned to a second class of first factors (e.g., metadata and drivers associated with a resource). Where no class of factors is to be emphasized more than another class of factors, the multipliers may be ignored or set at an equal value (e.g., 1.0) for each class of factors.

To indicate an importance of the first factors relative to the second factor, the weight component 220 may determine a global multiplier associated with the first factors or the second factor. Accordingly, the first factors (or the second factor) may be emphasized by increasing a global multiplier associated with the first factors (or the second factor), or deemphasized by decreasing the multiplier associated with the first factors (or the second factor). For example, a projected resource demand may be identified to be approximately a fraction or multiple of the historical resource demand. In such an example, the resource projection system 110 may set the global multiplier to be equal to an inverse of the identified fraction or multiple. In some examples, the global multiplier may be ignored or set at 1.0.

Based on the first factors, second factor, and/or weights, the projection component 230 is configured to use the projection model 260 to generate one or more projections for one or more scenarios. For example, the projection component 230 may generate a resource demand projection for each scenario associated with historical data, which includes a historical resource demand for each scenario. One formula for generating a resource demand projection for month m based on y-number of activity-related factors, z-number of resource-related factors, and a second factor $p_o$ is as follows:

$$F(m) = p_o + M_o(\Sigma_{n=1}^{y}(d_{mn}*w_{mn}*u_m*c_d) + \Sigma_{p=1}^{z}(r_{mp}v_{mp}*c_r)) \quad \text{(Eq. 1)}$$

where $M_o$ is a global multiplier associated with the first factors (e.g., activity-related factors and resource-related factors); $d_{mn}$ is a value associated with the $n^{th}$ activity-related factor for month m; $w_{mn}$ is a weight associated with the $n^{th}$ activity-related factor for month m; $u_m$ is a value associated with a duration of the activity for month m (may be 1 if there is no correlation between the activity-related factor and the activity duration); $c_d$ is a multiplier associated with the activity-related factors; $r_{mp}$ is a value associated with the $p^{th}$ resource-related factor for month m; $v_{mp}$ is a weight associated with the $p^{th}$ resource-related factor for month m; and $c_r$ is a multiplier associated with the resource-related factors.

The comparison component 240 is configured to determine an accuracy of the projection model 260 used to generate the resource demand projection. In some examples, the comparison component 240 may compare the projected resource demand with historical resource demand (e.g., actual effort) to determine or calculate a variance. On condition that the calculated variance satisfies a predetermined threshold, the projection model 260 is identified as being an accurate model. On the other hand, on condition that the calculated variance does not satisfy the predetermined threshold, the projection model 260 is identified as being an inaccurate model and the projection model 260 is programmatically adjusted.

The map component 250 is configured to classify one or more factors into time-related categories based on their impact on an accuracy of resource demand projections at various time frames. In some examples, the map component 250 may identify one or more resource demand projections at various time frames to classify one or more factors as long-term or short-term factors. The map component 250 may regressively apply the long-term and/or short-term factors to historical data to determine an accuracy of the classification. Long-term projections and short-term projections may be generated separately. That is, different sets of factors (with different weights) may be used for long- and short-term projections. On condition that the accuracy satisfies a predetermined threshold, a set of long-term and/or short-term factors may be identified to generate a long-term projection model 260 and/or a short-term projection model 260.

An input that the projection model 260 may generate for itself is a set of assumptions. For example, the first factors and the second factor may be used to generate the set of assumptions for each long-term and/or short-term projection model 260. In addition to identifying a variance between the projected resource demand and the historical resource demand, the map component 250 may identify one or more deviations in the assumptions. Upon identifying a deviation that has not been factored into the historical data (e.g., a new deviation), a recalibration loop is triggered.

The block diagram of FIG. 2 is merely illustrative of an example system that may be used in connection with one or more examples of the disclosure and is not intended to be limiting in any way. Further, peripherals or components of the computing devices known in the art are not shown, but are operable with aspects of the disclosure. In some examples, at least a portion of the functionality of the various elements in FIG. 2 may be performed by other elements in FIG. 2 or by an entity (e.g., processor, web service, server, applications, computing device, etc.) not shown in FIG. 2.

Figure 3:
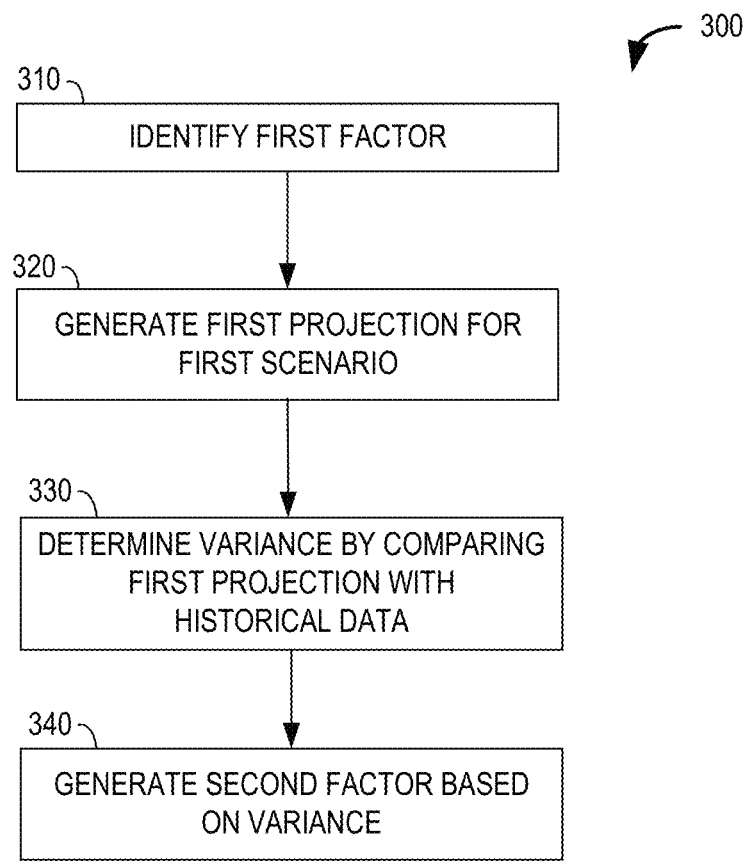
FIG. 3 is a flowchart illustrating an example method of projecting resource demand.

FIG. 3 is a flowchart illustrating an example method 300 including a plurality of operations to project resource demand. At 310, the resource projection system 110 identifies, from the initial data 200, one or more first factors for the projection model 260. Using the projection model 260, the resource projection system 110 generates at 320 a first projection for a first scenario. For an initial iteration, each first factor may be associated with an equal weight (or no weight).

Upon generating the first projection for the first scenario, the resource projection system 110 compares at 330 the first projection with historical data associated with the first scenario to determine a variance between the first projection and the historical data. The variance may be determined by taking a difference between the first projection and the historical data. If the variance between the first projection and the historical data does not satisfy a predetermined threshold, then weights and/or multipliers may be associated with one or more first factors to increase an accuracy of the projection model 260 (e.g., decrease the variance). In some examples, based on the variance, the resource projection system 110 generates at 340 a second factor (e.g., a pseudofactor) to increase the accuracy of the projection model 260. The second factor may be used, for example, to make adjustments that would be difficult to make by adjusting weights and/or multipliers associated with the first factors. For example, the second factor may be used to project resource demand based on non-linear variations associated with the factors in ways conventional techniques are unable to employ.

Figure 4:
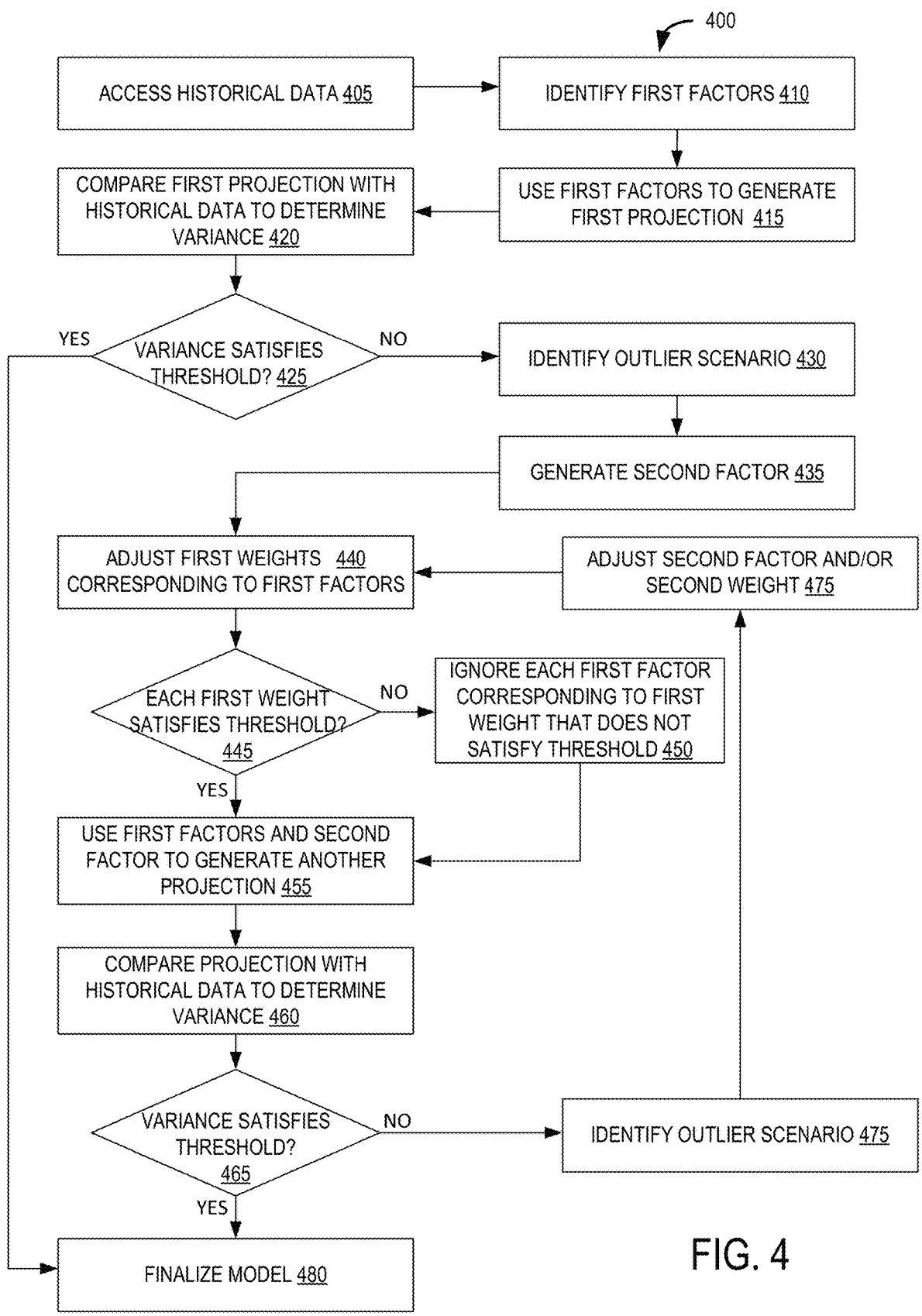
FIG. 4 is a flowchart illustrating a more detailed example method of projecting resource demand.

FIG. 4 is a flowchart illustrating a more detailed example method 400 of generating a projection model 260. The resource projection system 110 accesses at 405 historical data from various data sources 120. The historical data may include data associated with a plurality of scenarios, including an identification of one or more factors (e.g., drivers, metadata) and/or historical resource demand (e.g., actual efforts). The historical data may be associated with historical occurrences of the plurality of scenarios.

The resource projection system 110 identifies at 410 one or more first factors for the projection model 260. The resource projection system 110 uses at 415 the first factors to generate a first projection for each scenario associated with the historical data. For an initial iteration, each first factor may be associated with an equal weight (or no weight).

Upon generating the first projections, the resource projection system 110 compares at 420 the first projections with historical data associated with the plurality of scenarios to determine variances between the first projections and the historical data. It is determined at 425 whether each variance satisfies a predetermined variance threshold (e.g., 1%). If each variance is below the variance threshold, thereby satisfying the variance threshold, the projection model 260 is finalized at 480 for generating one or more projections using the present factors, weights, and multipliers.

On the other hand, if a variance does not satisfy the variance threshold, the scenario associated with the variance is identified at 430 as an outlier scenario. Based on the outlier scenario, the resource projection system 110 generates at 435 a second factor (e.g., pseudofactor) and/or adjusts at 440 one or more weights and/or multipliers associated with one or more first factors for use in the projection model 260. For example, the one or more weights and/or multipliers may be adjusted to facilitate increasing the accuracy of the projection model 260 (e.g., adjust the projection model 260 so that projection model 260 generates a more accurate projection for the outlier scenario). The second factor may be a black box that does not directly correspond to a first factor. It is determined at 445 whether each first weight satisfies a predetermined weight threshold (e.g., 5%). If any weight is less than the weight threshold, thereby not satisfying the weight threshold, the corresponding first factor is identified as being less significant and, thus, is ignored at 450.

Upon ignoring each first factor associated with a weight that does not satisfy the weight variance (if any), the resource projection system 110 uses at 455 the first factors, second factor, and/or weights to generate another (e.g., a second) projection for each scenario associated with the historical data. Upon generating the second projections, the resource projection system 110 compares at 460 the second projections with historical data associated with the plurality of scenarios to determine variances between the second projections and the historical data. It is determined at 465 whether each variance satisfies the variance threshold. If each variance is below the variance threshold, thereby satisfying the variance threshold, the projection model 260 is finalized at 480 for generating one or more projections using the present factors, weights, and multipliers.

On the other hand, if a variance does not satisfy the variance threshold, the scenario associated with the variance is identified at 475 as an outlier scenario. Based on the outlier scenario, the resource projection system 110 adjusts at 475 a value associated with the second factor and/or a weight (e.g., second weight) associated with the second factor, and/or adjusts at 440 one or more weights and/or multipliers associated with one or more first factors for use in the projection model 260 to facilitate increasing the accuracy of the projection model 260. The process may be iteratively implemented until a predetermined quantity or proportion of scenarios (e.g., 95%) are associated with a variance that satisfies the variance threshold. The examples described herein facilitate identifying a combination of factors that have an impact on reducing the variance between the projected demand and actual demand.

Figure 5:
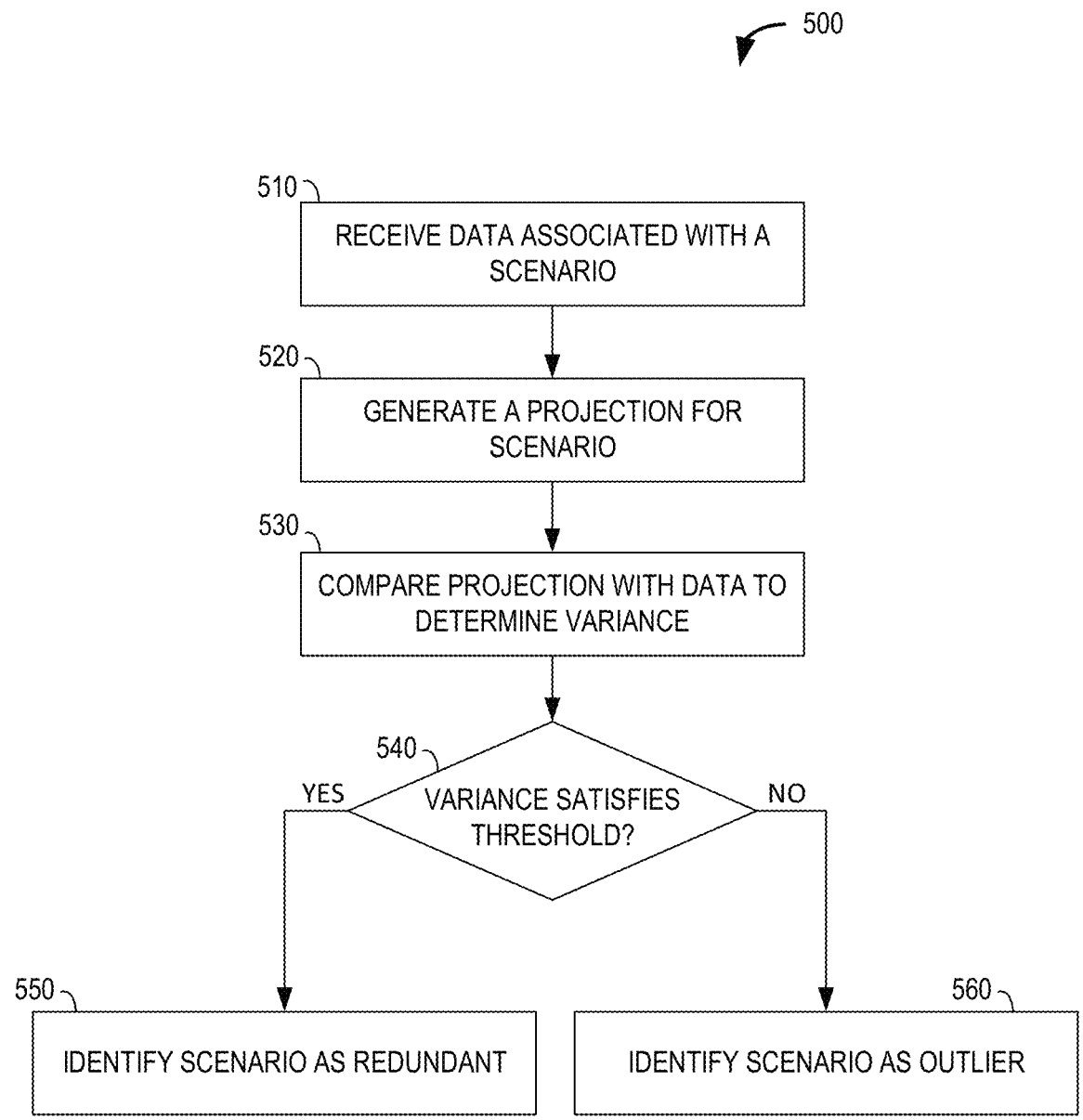
FIG. 5 is a flowchart illustrating an example method of identifying a scenario as a redundant scenario or an outlier scenario.

FIG. 5 shows a flowchart illustrating an example method 500 of identifying a scenario as a redundant scenario or an outlier scenario. The resource projection system 110 receives at 510 historical data associated with the scenario. One or more factors and one or more values associated with the factors may be identified based on the historical data. Based on the historical data, a projection is generated at 520 for the scenario. The projection is compared at 530 with historical data to determine a variance. For example, the projection may be compared with an actual effort associated with the scenario.

It is determined at 540 whether the variance between the projection and the actual effort satisfies a predetermined threshold. If the variance between the projection and the actual effort satisfies the predetermined threshold (e.g., the projection model 260 accurately predicted the actual effort), the scenario is identified at 550 as redundant. For example, the scenario may be identified as being the same or similar as other scenarios associated with the historical data. In some examples, a combination of factors and/or weights that results in a linear variation of an existing scenario may be identified as redundant and, thus, will not have any direct bearing on the projection model 260. The redundant scenarios may be ignored to facilitate reducing processing load, conserving memory, and/or reducing network bandwidth usage. On the other hand, if the variance does not satisfy the predetermined threshold, the scenario is identified at 560 as an outlier that may be used to adjust the projection model 260 so that the projection model 260 to facilitate adapting the projection model 260 to changing circumstances. In some examples, one or more outlier scenarios are stored for future use in one or more batches of outlier scenarios. For example, one or more outlier scenarios may be used as input for a later prediction if a trend that is consistent with the outlier is encountered.

The resource projection system 110 may analyze one or more outlier scenarios to identify one or more factors or one or more values associated with the factors that may have caused the scenario to be identified as an outlier. This analysis, and data resulting from the analysis, allows the resource projection system 110 to quickly recognize trends (e.g., repeating outlier scenarios), and/or variations in factors and/or values associated with the factors. As the projection model 260 is adjusted based on one or more outlier scenarios, in some examples, the number of outlier scenarios decrease.

In some examples, a scenario may not have a lot in common with other scenarios, making it difficult to compare the scenario with the other scenarios. For example, the scenario may be associated with a unique combination of factors. In such an example, the scenario may be identified as unique.

In one example, one may try to predict how many clinicians will be needed to conduct an investigative clinical trial for testing a new drug. Activities may include administering the drug, checking vital signs, conducting surveys, and the like. Resources may include drugs, medical equipment, rooms, and personnel. The resource projection system 110 may select, add, and/or subtract factors to explore various combinations of activities and/or resources to determine how many clinicians will be needed. Pseudofactors may also be taken into consideration. Various factors may change over time. For example, there may be changes to the activities and/or resources during the testing phase of the trial or an approval process associated with the trial. Data may be collected from the actual occurrence of the trial. The resource projection system 110 provides a smart process for analyzing the collected data and enables the projection model 260 to be dynamically and strategically adjusted over time based on the collected data. Accordingly, the resource projection system 110 may be used to identify a combination of factors that reliably predict demands placed on clinicians associated with the clinical trial.

Figure 6:
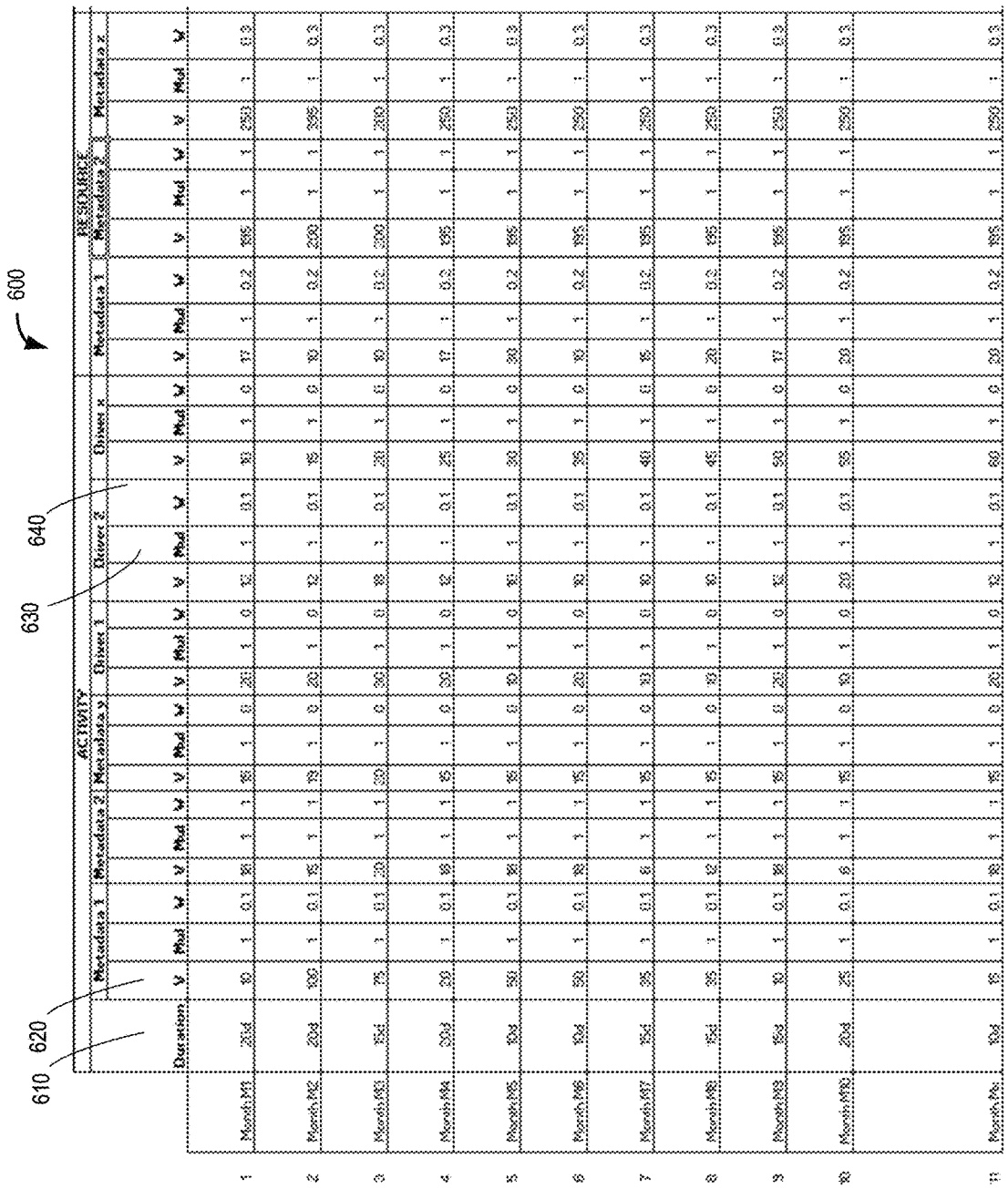

FIGS. 6 and 7 are screenshots of an example projection calculation using data over 11 months. FIG. 6 shows a first portion 600 of the projection calculation, and FIG. 7 shows a second portion of the projection calculation. Referring now to FIG. 6, the first portion 600 includes a plurality of factors (e.g., metadata and drivers) for an example activity and a plurality of factors (e.g., metadata) for corresponding resources. The first portion 600 includes projection calculations for each month including a duration 610 of the activity, and a value 620 (V), multiplier 630 (Mul), and weight 640 (W) for each factor (e.g., activity-related metadata, activity-related driver, resource-related metadata).

Figure 8:
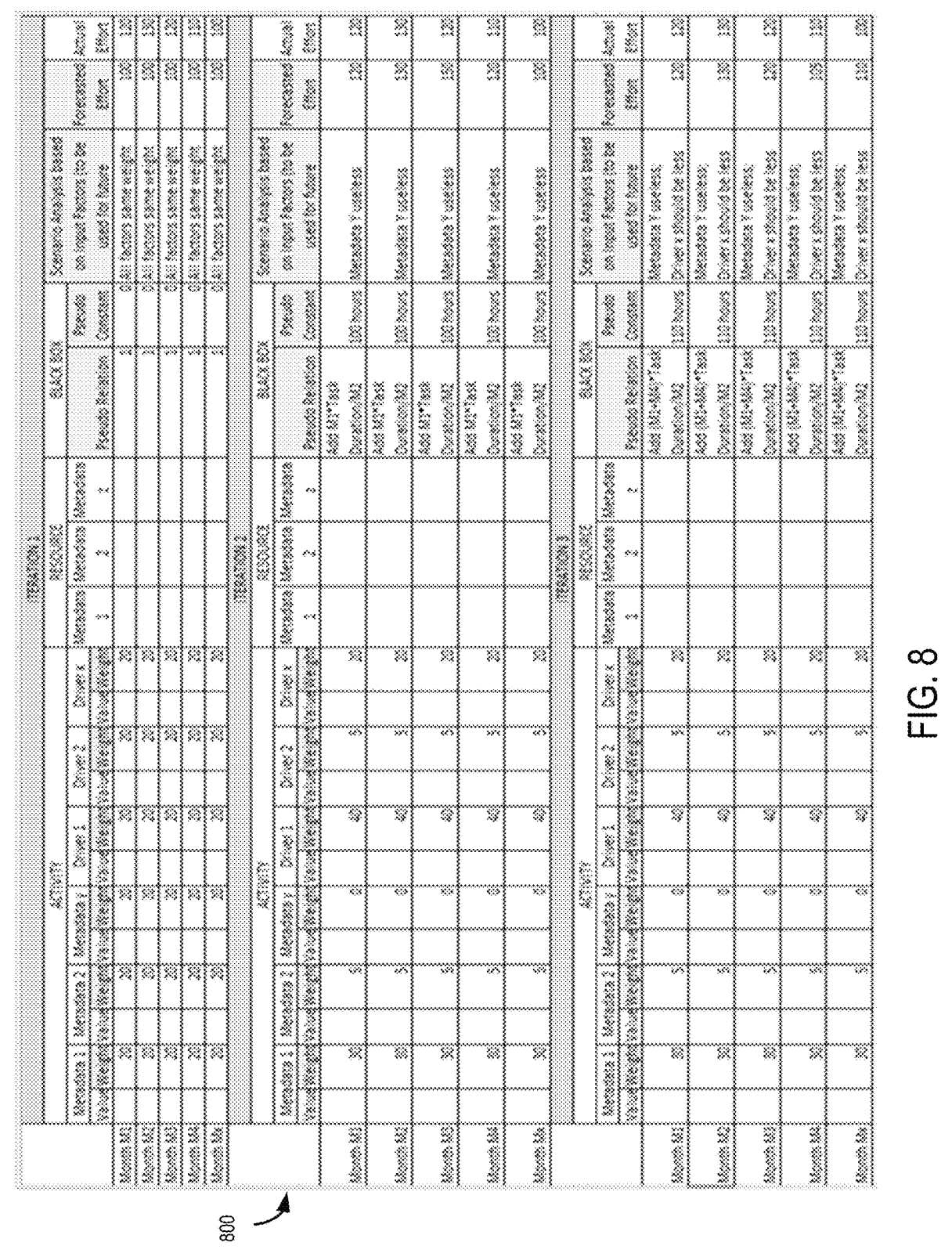

FIG. 7 shows the second portion 700 of the projection calculation including a pseudofactor 710 ("Black Box"), a projection 720 ("Forecasted Effort"), and historical data 730 ("Actual Effort"). The Black Box section for the pseudofactor 710 includes a pseudo relation 735 describing a relation between constants and derived weights (e.g., an algorithm used to calculate the projection), a multiplier 740 associated with the pseudofactor 710 ("Pseudo Multiplier"), a value 745 associated with the pseudofactor 710 ("Pseudo Constant"), and a set of assumptions 750 generated based on the activity-related factors, the resource-related factors, and the pseudofactor 710. The second portion 700 includes one or more scenario outcomes 760 that identify whether a scenario is a unique scenario, a redundant scenario, or an outlier scenario. The second portion 700 includes one or more scenario analysis 770 for one or more scenarios based on input factors. The second portion 700 includes data associated with a variance between the projection 720 and the historical data 730 including a variance percentage 780, and a variance result 790 that identifies whether the variance was greater than a predetermined threshold (e.g., 1%) or not. FIG. 8 shows a screenshot 800 of three iterations of an example projection calculation including data that is similar to that shown in FIGS. 6 and 7.

Figure 9:
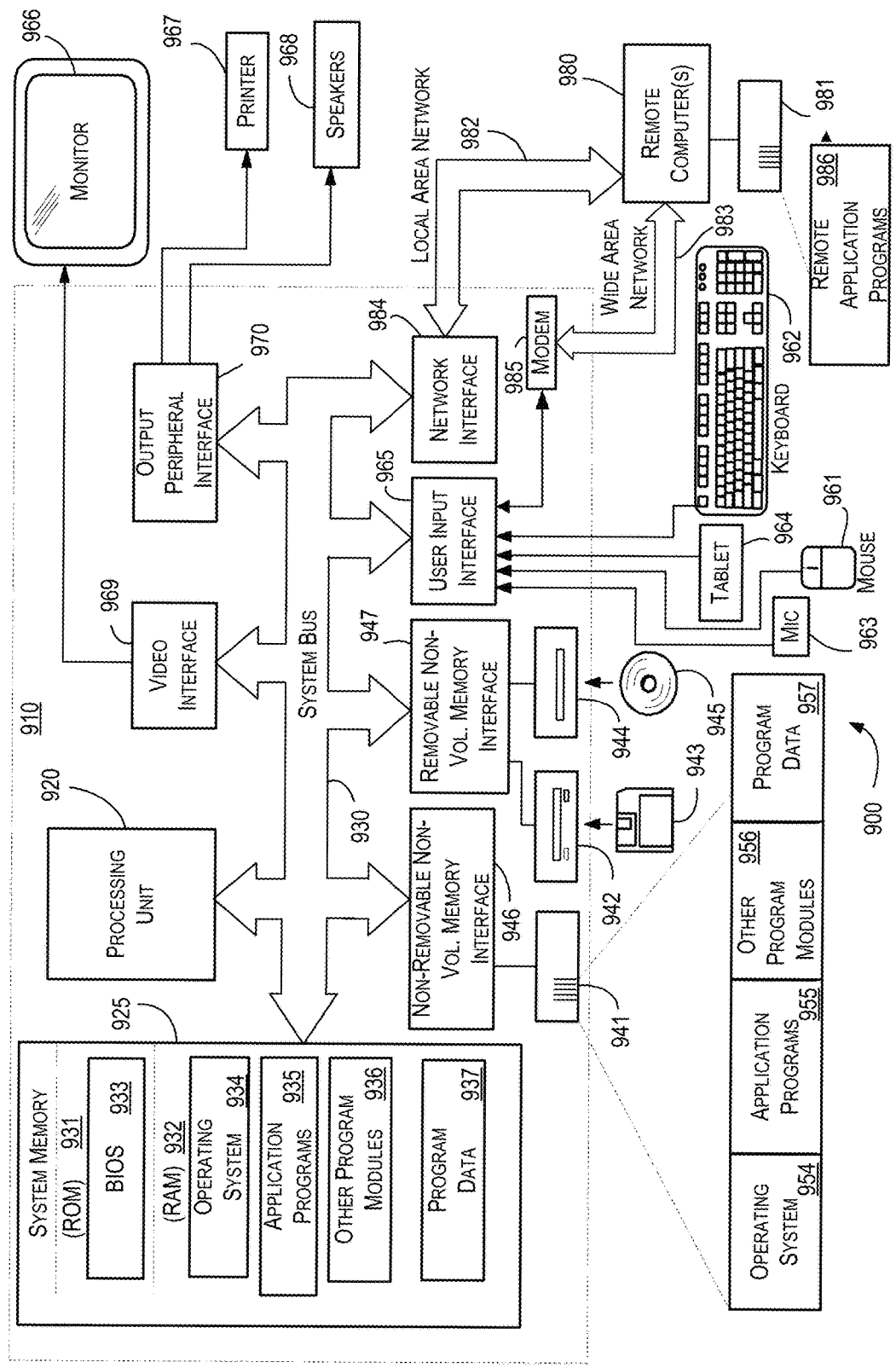
FIG. 9 is a block diagram of an example computing device that may be used to project resource demand in an environment, such as the environment shown in FIG. 1.

FIG. 9 is a block diagram of an example operating environment 900 that may be used to project resource demand in the environment 100 (shown in FIG. 1). The operating environment 900 is only one example of a computing and networking environment and is not intended to suggest any limitation as to the scope of use or functionality of the disclosure. The operating environment 900 should not be interpreted as having any dependency or requirement relating to any one or combination of components illustrated in the example operating environment 900.

Operating environment 900 may operate with numerous other computing and networking environments and/or configurations. While some examples of the disclosure are illustrated and described herein with reference to the operating environment 900, such as a resource projection system 110 (shown, for example, in FIG. 1), aspects of the disclosure are operable with any computing device (e.g., data source 120, data storage 130, outside server 150, user device 170) that executes instructions to implement the operations and functionality associated with the operating environment 900.

For example, the operating environment 900 may include a mobile device, a mobile telephone, a phablet, a tablet, a portable media player, a netbook, a laptop, a desktop computer, a personal computer, a server computer, a computing pad, a kiosk, a tabletop device, an industrial control device, multiprocessor systems, microprocessor-based systems, set top boxes, programmable consumer electronics, network computers, minicomputers, mainframe computers, distributed computing environments that include any of the above systems or devices, and the like. The operating environment 900 may represent a group of processing units or other computing devices. Additionally, any computing device described herein may be configured to perform any operation described herein including one or more operations described herein as being performed by another computing device.

With reference to FIG. 9, an example system for implementing various aspects of the disclosure may include a general purpose computing device in the form of a computer 910. Components of the computer 910 may include, but are not limited to, a processing unit 920, a system memory 925, and a system bus 930 that couples various system components including the system memory 925 to the processing unit 920. The system bus 930 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 925 includes any quantity of media associated with or accessible by the processing unit 920. For example, the system memory 925 may include computer storage media in the form of volatile and/or nonvolatile memory such as read only memory (ROM) 931 and random access memory (RAM) 932. The ROM 931 may store a basic input/output system 933 (BIOS) that facilitates transferring information between elements within computer 910, such as during start-up. The RAM 932 may contain data and/or program modules that are immediately accessible to and/or presently being operated on by processing unit 920. For example, the system memory 925 may store computer-executable instructions, communication data, authentication data, application data, and other data.

The processing unit 920 may be programmed to execute the computer-executable instructions for implementing aspects of the disclosure, such as those illustrated in the figures (e.g., FIGS. 3-5). By way of example, and not limitation, FIG. 9 illustrates operating system 934, application programs 935, other program modules 936, and program data 937. The processing unit 920 includes any quantity of processing units, and the instructions may be performed by the processing unit 920 or by multiple processors within the operating environment 900 or performed by a processor external to the operating environment 900.

The system memory 925 may include a factor component 210, a weight component 220, a projection component 230, a comparison component 240, and/or a map component 250. Upon programming or execution of these components, the operating environment 900 and/or processing unit 920 is transformed into a special purpose microprocessor or machine. For example, the factor component 210, when executed by the processing unit 920, causes the processing unit 920 to identify one or more factors associated with a task and/or a resource; the weight component 220, when executed by the processing unit 920, causes the processing unit 920 to determine one or more weights associated with one or more factors; the projection component 230, when executed by the processing unit 920, causes the processing unit 920 to generate a projection for a scenario based on one or more factors; the comparison component 240, when executed by the processing unit 920, causes the processing unit 920 to determine a variance based on a projection and historical data; and the map component 250, when executed by the processing unit 920, causes the processing unit 920 to classify one or more factors into one or more categories. Although the processing unit 920 is shown separate from the system memory 925, examples of the disclosure contemplate that the system memory 925 may be onboard the processing unit 920 such as in some embedded systems.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 942 that reads from or writes to a removable, nonvolatile magnetic disk 943 (e.g., a floppy disk, a tape cassette), and an optical disk drive 944 that reads from or writes to a removable, nonvolatile optical disk 945 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 941 may be connected to the system bus 930 through a non-removable memory interface such as interface 946, and magnetic disk drive 942 and optical disk drive 944 may be connected to the system bus 930 by a removable memory interface, such as interface 947.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 954, application programs 955, other program modules 956 and program data 957. Note that these components may either be the same as or different from operating system 934, application programs 935, other program modules 936, and program data 937. Operating system 954, application programs 955, other program modules 956, and program data 957 are given different numbers herein to illustrate that, at a minimum, they are different copies.

The computer 910 includes a variety of computer-readable media. Computer-readable media may be any available media that may be accessed by the computer 910 and includes both volatile and nonvolatile media, and removable and non-removable media. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. ROM 931 and RAM 932 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 910. Computer storage media are implemented in hardware and exclude carrier waves and propagated signals. Any such computer storage media may be part of computer 910.

Communication media typically embodies computer-readable instructions, data structures, program modules or other data in a modulated data signal such as a carrier wave or other transport mechanism and includes any information delivery media. Modulated data signal means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 910 through one or more input devices, such as a pointing device 961 (e.g., mouse, trackball, touch pad), a keyboard 962, a microphone 963, and/or an electronic digitizer 964 (e.g., tablet). Other input devices not shown in FIG. 9 may include a joystick, a game pad, a controller, a satellite dish, a camera, a scanner, an accelerometer, or the like. These and other input devices may be coupled to the processing unit 920 through a user input interface 965 that is coupled to the system bus 930, but may be connected by other interface and bus structures, such as a parallel port, game port or a universal serial bus (USB).

Information, such as text, images, audio, video, graphics, alerts, and the like, may be presented to a user via one or more presentation devices, such as a monitor 966, a printer 967, and/or a speaker 968. Other presentation devices not shown in FIG. 9 may include a projector, a vibrating component, or the like. These and other presentation devices may be coupled to the processing unit 920 through a video interface 969 (e.g., for a monitor 966 or a projector) and/or an output peripheral interface 970 (e.g., for a printer 967, a speaker 968, and/or a vibration component) that are coupled to the system bus 930, but may be connected by other interface and bus structures, such as a parallel port, game port or a USB. In some examples, the presentation device is integrated with an input device configured to receive information from the user (e.g., a capacitive touch-screen panel, a controller including a vibrating component). Note that the monitor 966 and/or touch screen panel may be physically coupled to a housing in which the computer 910 is incorporated, such as in a tablet-type personal computer.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 982 and one or more wide area networks (WAN) 983, but may also include other networks. Such networking environments are commonplace in offices, enterprise-wide computer networks, intranets and the Internet.

When used in a LAN networking environment, the computer 910 is coupled to the LAN 982 through a network interface or adapter 984. When used in a WAN networking environment, the computer 910 may include a modem 985 or other means for establishing communications over the WAN 783, such as the Internet. The modem 985, which may be internal or external, may be connected to the system bus 930 via the user input interface 965 or other appropriate mechanism. A wireless networking component such as including an interface and antenna may be coupled through a suitable device such as an access point or peer computer to a LAN 982 or WAN 983. In a networked environment, program modules depicted relative to the computer 910, or portions thereof, may be stored in the remote memory storage device. By way of example, and not limitation, FIG. 9 illustrates remote application programs 986 as residing on memory storage device 981. It may be appreciated that the network connections shown are examples and other means of establishing a communications link between the computers may be used.

The block diagram of FIG. 9 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 9 may be performed by other elements in FIG. 9, or an entity (e.g., processor, web service, server, applications, computing device, etc.) not shown in FIG. 9.

The subject matter described herein enables a computing device to automatically create a predictive model that projects resource demand. The predictive model may be automatically calibrated (and recalibrated) based on outlier data. For example, one or more projections may be compared with historic data, and based on a variance between the projections and the historic data, one or more pseudofactors may be generated to adjust a machine learning model configured to project resource demand. In this manner, the computing device may be configured to adapt to recent trends in a calculated and systematic manner for increased performance.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

The subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of the back end, middleware, or front end components. The computing system may include clients and servers. A client and server are generally remote from each other and typically interact through a communication network. The relationship of client and server arises by virtue of computer programs running on the respective computers and having a client-server relationship to each other.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Examples of the disclosure may also be practiced in distributed computing environments where tasks are performed by remote processing devices that are linked through a communications network. In a distributed computing environment, program modules may be located in local and/or remote computer storage media including memory storage devices.

The examples illustrated and described herein as well as examples not specifically described herein but within the scope of aspects of the disclosure constitute an example means for predicting resource demand for one or more scenarios. For example, the elements illustrated in FIG. 2, such as when encoded to perform the operations illustrated in FIGS. 3-5, constitute an example means for identifying one or more first factors associated with a task and/or a resource (e.g., factor component 210); an example means for determining one or more weights or multipliers associated with one or more factors (e.g., weight component 220); an example means for generating a projection for a scenario (e.g., projection component 230); an example means for comparing a projection with historical data to determine a variance (e.g., comparison component 240); and an example means for generating a second factor (e.g., factor component 210).

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. Moreover, the separation of various system components in the examples described above should not be understood as requiring such separation in all examples, and it should be understood that the described program components and systems may generally be integrated together in a single software product or packaged into multiple software products.

When introducing elements of aspects of the disclosure or the examples thereof, the articles "a," "an," "the," and "said" are intended to mean that there are one or more of the elements. Furthermore, references to an "example" of the present disclosure are not intended to be interpreted as excluding the existence of additional examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

identifying one or more first factors associated with a task and/or a resource;
generating a first projection for a first scenario;
comparing a first projection with first historical data to determine a first variance;
generating a second factor;
determining one or more first weights associated with one or more first factors;
determining whether at least one first weight satisfies a predetermined threshold;
ignoring a first factor;
using one or more first factors and a second factor to generate a second projection for a second scenario;

comparing a second projection with second historical data to determine a second variance;
adjusting one or more first weights associated with one or more first factors or a second weight associated with a second factor to generate a second model configured to predict resource demand for the one or more scenarios;
identifying a second scenario as a redundant scenario;
adjusting a global multiplier associated with one or more first factors;
classifying one or more first factors as a short-term factor and/or a long-term factor;
a factor component configured to identify one or more first factors associated with a task and/or a resource;
a projection component configured to generate a first projection for a first scenario based on one or more first factors;
a projection component configured to generate a second projection for a second scenario based on one or more first factors and a second factor;
a comparison component configured to determine a first variance based on a first projection and first historical data corresponding to a first scenario;
a comparison component configured to determine a second variance based on a second projection and second historical data corresponding to a second scenario;
a comparison component configured to identify a second scenario as a redundant scenario;
a weight component configured to determine one or more first weights associated with one or more first factors;
a weight component configured to determine whether at least one first weight satisfies a predetermined threshold;
a weight component configured to ignore a first factor;
a weight component configured to adjust one or more first weights associated with one or more first factors, and a second weight associated with a second factor to at least partially generate a second model configured to predict resource demand for one or more scenarios; and
a weight component configured to adjust a global multiplier associated with one or more first factors.

In some examples, the operations illustrated in the drawings may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for predicting resource demand for one or more scenarios, the method comprising:
    identifying, by a processor device, one or more first factors that correspond to one or more of a task and a resource, the one or more first factors associated with a plurality of scenarios;
    generating, by the processing device, a model associated with the plurality of scenarios, the model including the identified one or more first factors;
    using, by the processing device, the generated model to generate a first projection for each of the plurality of scenarios, the first projections associated with expected resource demands for respective ones of the plurality of scenarios;
    comparing, by the processing device, the generated first projections with first historical data;
    determining, by the processing device, based on the comparing, a variance between each of the generated first projections and the first historical data, the first historical data associated with an actual resource demand for the plurality of scenarios;
    identifying a first projection of the generated first projections as an outlier scenario in response to determining the variance for the identified first projection is outside a variance threshold;
    generating, by the processing device, a second factor based on the outlier scenario and based on a non-linear variation associated with the identified one or more first factors, the second factor configured to increase an accuracy of the model;
    generating, by the processing device, an adjusted model associated with the plurality of scenarios using the one or more first factors and the second factor;
    using the adjusted model, generating, by the processing device, a second projection for a second scenario of the plurality of scenarios, the second projection associated with an expected resource demand for the second scenario;
    comparing, by the processing device, the generated second projection with second historical data to determine a second variance between the generated second projection and the second historical data, the second historical data associated with an actual resource demand for the second scenario;
    on condition that the second variance satisfies a predetermined threshold, by the processing device,
        identifying the second scenario as a redundant scenario,
        ignoring the redundant scenario to facilitate at least one of reducing processor load, conserving memory, and reducing bandwidth usage, and
        finalizing the adjusted model as a model for predicting resource demand using the one or more first factors and the second factor; and
    on condition that the second variance does not satisfy the predetermined threshold, by the processing device,
        identifying the second scenario as a second outlier scenario,
        adjusting one or more first weights associated with the one or more first factors or a second weight associated with the second factor, and
        increasing an accuracy of the adjusted model based on the adjusting of the one or more first weights.

2. The computer-implemented method of claim 1, further comprising determining, by the processing device, the one or more first weights associated with the one or more first factors.

3. The computer-implemented method of claim 2, further comprising:
    determining, by the processing device, whether at least one first weight of the one or more first weights satisfies a predetermined threshold; and
    on condition that the at least one first weight satisfies the predetermined threshold, ignoring, by the processing device, a corresponding first factor of the one or more first factors.

4. The computer-implemented method of claim 1, wherein on condition that the generated second projection is a multiple of second historical data, adjusting, by the processing device, a global multiplier associated with the one or more first factors, the second historical data associated with an actual resource demand for the second scenario.

5. The computer-implemented method of claim 1, further comprising the processing device classifying the one or more first factors as one or more of a short-term factor and a long-term factor.

6. A computing device for predicting resource demand for one or more scenarios, the computing device comprising:
 a memory that stores data associated with a plurality of scenarios and computer-executable instructions, the data including historical data; and
 a hardware processor that executes the computer-executable instructions to:
  identify one or more first factors that correspond to one or more of a task and a resource, the task and the resource associated with the one or more scenarios;
  generate a model associated with the plurality of scenarios, the model including the identified one or more first factors;
  generate, using the generated model, a first projection for each of the plurality of scenarios, the first projections associated with expected resource demands for respective ones of the plurality of scenarios;
  based on the generated first projection and first historical data of the historical data, determine a variance between each of the generated first projections and the first historical data, the first historical data associated with an actual resource demand for the plurality of scenarios;
  identify a first projection of the generated first projections as an outlier scenario in response to determining the variance for the identified first projection is outside a variance threshold;
  generate a second factor based on the outlier scenario and based on a non-linear variation associated with the identified one or more first factors, the second factor configured to increase an accuracy of the model;
  generate an adjusted model associated with the plurality of scenarios, the generated adjusted model including the one or more first factors and the second factor;
  generate, using the adjusted model, a second projection for a second scenario of the plurality of scenarios, the second projection associated with an expected resource demand for the second scenario;
  based on the generated second projection and second historical data of the historical data, determine a second variance, the second historical data associated with an actual resource demand for the second scenario;
  on condition that the second variance satisfies a predetermined threshold,
   identify the second scenario as a redundant scenario,
   ignore the redundant scenario to facilitate at least one of reducing processor load, conserving memory, and reducing bandwidth usage, and
   finalize the adjusted model as a model for predicting resource demand using the one or more first factors and the second factor; and
  on condition that the second variance does not satisfy the predetermined threshold, by the processing device,
   identify the second scenario as a second outlier scenario,
   adjust one or more first weights associated with the one or more first factors or a second weight associated with the second factor, and
   increase an accuracy of the adjusted model based on the adjusting of the one or more first weights.

7. The computing device of claim 6, wherein the hardware processor is further to execute the computer-executable instructions to determine the one or more first weights associated with the one or more first factors.

8. The computing device of claim 7, wherein the hardware processor is further to execute the computer-executable instructions to:
 determine whether at least one first weight of the one or more first weights satisfies a predetermined threshold; and
 on condition that the at least one first weight satisfies the predetermined threshold, ignore a corresponding first factor of the one or more first factors.

9. The computing device of claim 6, wherein on condition that the generated second projection is a multiple of second historical data of the historical data, the executable instructions are to cause the hardware processor to adjust a global multiplier associated with the one or more first factors, the second historical data associated with an actual resource demand for the second scenario.

10. The computing device of claim 6, wherein the hardware processor is further to execute the computer-executable instructions to classify the one or more first factors as one or more of a short-term factor and a long-term factor.

11. A non-transitory computer-readable memory device having computer-executable instructions, which, upon execution by a processor coupled to the non-transitory computer-readable memory devices, causes the processor to perform operations comprising:
 identifying one or more first factors associated with a plurality of scenarios, the one or more first factors corresponding to one or more of a task and a resource;
 generating a model associated with the plurality of scenarios, the model including the identified one or more first factors;
 generating, using the generated model, a first projection for each of the plurality of scenarios, the first projections associated with expected resource demands for respective ones of the plurality of scenarios;
 based on the generated first projections and first historical data, determining a variance between each of the generated first projections and the first historical data, the first historical data associated with an actual resource demand for the plurality of scenarios;
 identifying a first projection of the generated first projections as an outlier scenario in response to determining the variance for the identified first projection is outside a variance threshold;
 generating a second factor based on the outlier scenario and a non-linear variation associated with the identified one or more first factors, the second factor configured to increase an accuracy of the model;
 generating an adjusted model associated with the plurality of scenarios, the generated adjusted model including the one or more first factors and the second factor;
 generating a second projection for a second scenario of the plurality of scenarios, the second projection associated with an expected resource demand for the second scenario;
 based on the generated second projection and second historical data, determining a second variance, the second historical data associated with an actual resource demand for the second scenario;

on condition that the second variance satisfies a predetermined threshold,
identifying the second scenario as a redundant scenario,
ignoring the redundant scenario to facilitate at least one of reducing processor load, conserving memory, and reducing bandwidth usage, and
finalizing the adjusted model as a model for predicting resource demand using the one or more first factors and the second factor; and on condition that the second variance does not satisfy the predetermined threshold,
identifying the second scenario as a second outlier scenario,
adjusting one or more first weights associated with the one or more first factors or a second weight associated with the second factor, and
increasing an accuracy of the adjusted model based on the adjusting of the one or more first weights.

12. The non-transitory computer-readable memory device of claim 11, having computer-executable instructions, which, upon execution by the processor, causes the processor to perform operations comprising determining, by a weight component, the one or more first weights associated with the one or more first factors.

13. The non-transitory computer-readable memory device of claim 12, having computer-executable instructions, which, upon execution by the processor, causes the processor to perform operations comprising:
determining that at least one first weight of the one or more first weights satisfies a predetermined threshold; and
ignoring a corresponding first factor of the one or more first factors.

14. The non-transitory computer-readable memory device of claim 11, wherein on condition that the generated second projection is a multiple of second historical data, the computer executable instructions, upon execution by the processor, cause the processor to adjust a global multiplier associated with the one or more first factors, the second historical data associated with an actual resource demand for the second scenario.

* * * * *